United States Patent [19]

Ishii

[11] Patent Number: 5,005,285
[45] Date of Patent: Apr. 9, 1991

[54] METHOD OF PRODUCING AN ALUMINUM HEAT EXCHANGER

[75] Inventor: Yutaka Ishii, Isesaki, Japan

[73] Assignee: Sanden Corporation, Isesaki, Japan

[21] Appl. No.: 102,250

[22] Filed: Sep. 28, 1987

Related U.S. Application Data

[63] Continuation of Ser. No. 830,200, Feb. 18, 1986, abandoned.

[30] Foreign Application Priority Data

Feb. 15, 1985 [JP] Japan .................................. 60-26486

[51] Int. Cl.$^5$ .............................................. B23P 15/26
[52] U.S. Cl. .......................... 29/890.043; 29/890.054; 228/198
[58] Field of Search .............. 29/157.3 R; 228/263.17, 228/198, 183, 56.3, 224; 219/145.22

[56] References Cited

U.S. PATENT DOCUMENTS

| | | | |
|---|---|---|---|
| 1,734,932 | 11/1929 | Weed | 228/56.3 |
| 2,565,477 | 8/1951 | Crowell et al. | 113/110 |
| 2,837,450 | 10/1952 | Moore et al. | 228/263.17 |
| 2,989,941 | 11/1960 | Goerg, Sr. | 228/224 |
| 3,259,973 | 7/1966 | Quaas et al. | 228/224 |
| 3,440,712 | 4/1969 | Stroup et al. | 228/263.17 |
| 3,703,254 | 11/1972 | Maierson et al. . | |
| 3,951,328 | 4/1976 | Wallace et al. . | |
| 3,971,501 | 7/1976 | Cooke . | |
| 4,358,485 | 11/1982 | Kern et al. . | |
| 4,579,605 | 4/1986 | Kawase et al. . | |

FOREIGN PATENT DOCUMENTS

| | | | |
|---|---|---|---|
| 2289291 | 5/1976 | France | 228/56.3 |
| 2389448 | 1/1979 | France | 228/56.3 |
| 54-33836 | 12/1979 | Japan . | |
| 56-160869 | 12/1981 | Japan . | |
| 0022868 | 2/1982 | Japan | 228/263.17 |
| 0218263 | 5/1983 | Japan | 228/263.17 |
| 0103958 | 6/1983 | Japan | 228/263.17 |
| 0229280 | 12/1984 | Japan | 228/263.17 |
| 59-229280 | 12/1984 | Japan . | |

OTHER PUBLICATIONS

Metals Handbook, 8th Ed., vol. 6, *Welding and Brazing*, "Brazing of Aluminum Alloys", American Society for Metals, 1971, pp. 675-684.

Primary Examiner—Howard N. Goldberg
Assistant Examiner—I. Cuda
Attorney, Agent, or Firm—Banner, Birch, McKie & Beckett

[57] ABSTRACT

A method of producing an aluminum or aluminum alloy heat exchanger which involves the use of an aluminum-silicon alloy brazing filler metal element bearing zinc. During brazing, a diffused zinc layer is formed on the surface of the brazed connection and on the surface of the heat exchanger core in the vicinity thereof to protect the heat exchanger against corrosion.

7 Claims, 1 Drawing Sheet

METHOD OF PRODUCING AN ALUMINUM HEAT EXCHANGER

This application is a continuation, of application Ser. No. 830,200, filed Feb. 18, 1896, now abandoned.

BACKGROUND OF THE INVENTION

1. Field of the Invention

The present invention relates to a method of producing an aluminum or aluminum alloy heat exchanger, especially an automotive heat exchanger, which is resistant to corrosion particularly at and in the vicinity of the brazed connections or junctions between the heat exchanger core and the inlet and outlet pipes or manifolds.

2. Description of Related Art

Because of their high thermal conductivity and excellent corrosion resistance, copper alloys have long been used for fabricating automotive heat exchangers, such as radiators, condensers and evaporators. In recent years, however, aluminum and aluminum alloys have begun to replace the copper alloys in automotive applications due to their generally lower cost and the potential for significant savings in weight.

Automotive heat exchangers typically comprise an assembly of a refrigerant conduit pipe, or pipes (referred to generally as the heat exchanger core) and interposed cooling fins. Refrigerant is flowed into and out from the heat exchanger core through inlet and outlet pipes or manifolds which, in the case of aluminum heat exchangers, are brazed to the heat exchanger core.

Unfortunately, heat exchangers made of aluminum and aluminum alloys are more susceptible to corrosion. Aluminum heat exchangers are particularly susceptible to electrolytic corrosion caused by water-soluble salts which are widespread in the environment. For example, a heat exchanger used as the condenser of an automotive air conditioning apparatus is generally mounted in the front portion of the engine compartment and will be exposed to extended operation at elevated temperatures while at the same time being exposed to the influence of water-soluble salts. These circumstances cause pits to form on the heat exchanger surface or core. Within a short period of time these pits quickly grow and eventually cause holes or cracks to form in the heat exchanger core leading to the leakage of refrigerant. Of course, in many cases the heat exchanger must then be replaced.

In order to prevent refrigerant leakage caused by such pit formation, the surface of automotive heat exchangers generally are chemically treated or are provided with a physical coating in order to form a protective film. Provided a faultless protective film can be formed and maintained on the surface of the heat exchanger, this treatment provides good protection against corrosion. However, it is virtually impossible to form a faultless protective film on the heat exchanger surface, thus satisfactory corrosion resistance is not attained by this method. Moreover, such films as easily damaged by physical impacts (e.g., from collisions, mishandling, etc.), causing cracks to form in the protective film, thus destroyng its integrity.

In another method designed to solve the corrosion problem, metals such as zinc (Zn) and/or tin (Sn) are incorporated into the fin material, in order to lower its electrical potential relative to that of the flat tube or core. In this way, the fin material is preferentially corroded, thus protecting the flat tube from corrosion. This approach, however, requires the use of special fin materials, thus increasing the expense of the heat exchanger. Moreover, the heat exchanger core is protected only in the vicinity of the cooling fins, and receives essentially no protection in areas removed from the fins. For example, in cases where brazing between a main pipe, that is the heat exchanger core, and a refrigerant inlet pipe or a refrigerant outlet pipe, that is the inlet and outlet manifolds, is affected by use of a solder consisting of an aluminum-silicon alloy, pittings often are formed in the vicinity of the solder, thus causing leakage of refrigerant.

It also is known to protect aluminum heat exchangers by coating the heat exchanger core with a flux containing zinc chloride ($ZnCl_2$), followed by brazing to diffuse the zinc over the surface of the heat exchanger. However, the flux itself is quite corrosive and if excess flux is left on the core it corrodes the tube wall leading to tube failure. Thus, in order to ensure that any excess flux is removed, the heat exchanger must be thoroughly washed after brazing. This procedure introduces another step in the manufacturing process and also requires expensive pollution abatement facilities to handle the wash water.

On the other hand, in cases where a noncorrosive flux is used for brazing the heat exchanger, while the washing of excess flux and problem with flux-related corrosion can be avoided, the above-described problems relating for example to electrolytic corrosion particularly at and in the vicinity of the brazed connections are still present and must be addressed.

SUMMARY OF THE INVENTION

It is an object of the present invention to provide a method of producing an aluminum or aluminum alloy heat exchaner (hereinafter referred to simply as an aluminum heat exchanger) which resists corrosion in the vicinity of brazed connections.

According to the present invention, there is provided a method of producing an aluminum heat exchanger having a heat exchanger core with inlet and outlet openings and inlet and outlet pipes connected thereto, wherein both the heat exchanger core and the inlet and outlet pipes are made of an aluminum material, comprising brazing the heat exchanger core to the inlet and outlet pipes with a brazing filler metal consisting essentially of an aluminum-silicon alloy containing zinc to form a brazed connection, said brazing causing said zinc to diffuse into the surface of the brazed connection and into the heat exchanger core adjacent to the brazed connection to form a diffused zinc layer.

Further objects, features and other aspects of this invention will be understood from the following detailed description of a preferred embodiment of this invention with reference to the annexed drawings.

DETAILED DESCRIPTION OF THE PREFERRED EMBODIMENT

Figure 1:
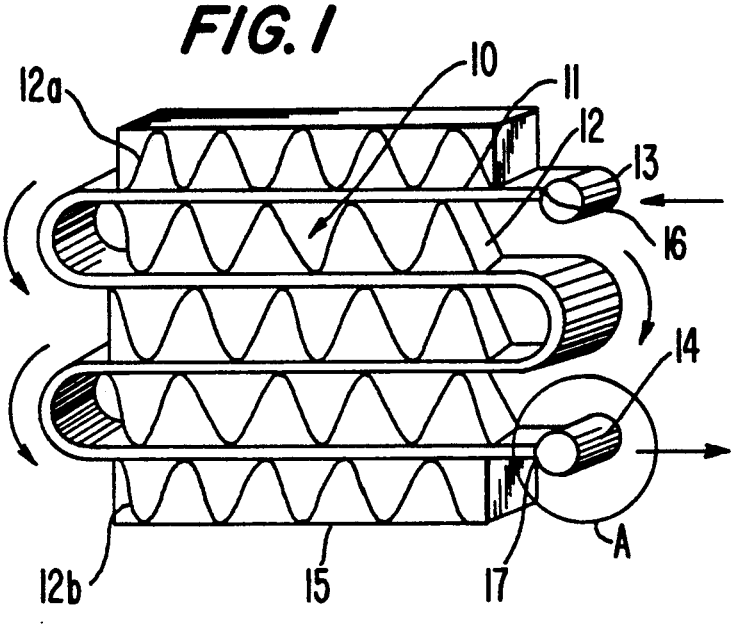
FIG. 1 is a perspective view of an aluminum heat exchanger produced according to the present invention.

Referring to FIG. 1, an aluminum heat exchanger 10 according to one embodiment of the present invention is illustrated. The heat exchanger 10 has an arrangement generally similar to known serpentine-type heat exchangers typically used as evaporators and condensers in automotive air conditioning apparatus. The heat exchanger 10 comprises a generally flat tube or heat exchanger core 11, having inlet and outlet openings at its opposite terminal ends, 16 and 17 respectively. The heat exchanger core is bent so as to form a tortuous (serpentine) flow path. The flat tube has an internal construction of multiple parallel channels (see FIG. 2). Thus, flat tube or core 11 provides a plurality of parallel fluid passageways. Flat tube 11 can be produced by extruding aluminum material. The side, contoured ends of the heat exchanger are routed to facilitate the extrusion.

As used in the specifications and claims, the phrase "aluminum material" includes both pure aluminum and aluminum alloys, that is alloys having aluminum as the predominant constituent. Corrugated fins 12, each of which is fabricated, for example, from aluminum material and folded into a wave or corrugated form, are disposed between opposing parallel portions of flat tube 11.

The inlet opening at one terminal end 16 of heat exchanger core 11 is connected to an inlet pipe or inlet manifold 13, which communicates, for example, which one end of a refrigerant circuit for introducing refrigerant into the flow channels of heat exchanger core 11. The outlet opening at the other end 17 of heat exchanger core 11 is connected to an outlet pipe or outlet manifold 14 for collecting and recirculating refrigerant through the air conditioning circuit. Liquid refrigerant or other heat exchange fluid flows from inlet pipe or manifold 13 through the parallel flow channels of heat exchanger core 11 and out through the outlet pipe or manifold 14. Protective plates 15 are securely joined to the outermost portions of flat tube 11, by being brazed to the outer corrugated fins 12a and 12b.

Flat tube or core 11 of heat exchanger 10 generally is fabricated from pure aluminum or preferably from a corrosion resistant aluminum alloy (e.g., an aluminum-manganese alloy, an aluminum manganese-copper alloy, an aluminum-copper alloy, etc.). Typically any of the AA 1000 series aluminum alloys should be suitable. Generally, the heat exchanger tube has a wall thickness on the order of about 700–900μ. The inlet and outlet manifolds 13 and 14 preferably are made from an aluminum manganese alloy and pure aluminum. Corrugated fins 12 typically comprise an aluminum alloy brazing sheet having an aluminum-manganese alloy core, and a cladding of an aluminum-silicon alloy brazing filler metal. As those skilled in the art will recognize, aluminium alloys having from about 4.5–13% (by weight) silicon are particularly useful as brazing filler metals.

Figure 3:
FIG. 3 is a perspective view showing an example of a unitary brazing filler metal element.

In accordance with the present invention, the connections between heat exchanger core 11 and the inlet and outlet pipes or manifolds 13 and 14 are brazed together using a brazing filler metal consisting essentially of an aluminum-silicon alloy containing zinc. Normally, unitary brazing filler metal elements comprising a rod or cylinder of the brazing filler metal configured to the shape of the connection to be brazed are placed at the junctions between the fluid inlet pipe or manifold 13 and fluid outlet pipe or manifold 14 and the terminal ends (openings) of heat exchanger core 11. An example of a brazing filler metal element 20 suitable for use in the present invention is shown in FIG. 3.

As a material for use as the brazing filler metal and in particular for element 20, there can be used an aluminum-silicon alloy containing from about 4.5% to about 13.0% by weight silicon and having a melting point lower than that of the aluminum materials used for the heat exchanger core and the inlet and outlet manifolds. In this embodiment the brazing filler metal element has zinc attached to it generally as a coating. The coating can be applied inter alia by chemical plating techniques, by electroplating techniques, by vacuum vapor deposition techniques or simply by adhering zinc powder to the filler metal element using a variety of procedures. Of course, application of a zinc powder could be accomplished easily after the brazing filler metal has already been placed at the connection to be brazed. The present invention also comtemplates using an aluminum-silicon-zinc alloy as the brazing filling metal. As used in the specification and claims, therefore, the phrase "aluminum-silicon alloy containing zinc" is intended to embrace all of these various embodiments.

During brazing, the zinc, e.g. the zinc coating on the brazing filler metal element, diffuses into the brazing filler metal and into the surface of the tube in the vicinity of the brazed connection to form a diffused zinc layer on the surface of the brazed connection and on the adjacent surface of the heat exchanger core. The thickness of the diffused zinc layer is preferably within the range of from about 70 to 100μ, and the density of zinc at the surface of the heat exchanger core (flat tube) is preferably from about 0.4% to 1.2% (by weight).

The diffused zinc layer formed on the brazed connection and on the heat exchanger core or flat tube 11 in the vicinity of the brazed connection function as a sacrificial anode. As a consequence of how it is formed, the zinc layer has a higher density of zinc on the upper surface of the brazed connection and on the flat tube relative to the diffused inner portion of the zinc layer. As a consequence of this structure, corrosion occurs in a horizontal direction in preference to corrosion in a vertical direction. In other words, the corrosion tends to develop and progress along the surface of the flat tube and the brazed connection, rather than or in preference to pit formation through the tube wall and the brazed connection. As a result, any corrosion which occurs on the surface of the heat exchanger does not directly result in leakage of refrigerant. Consequently, the life of the brazed connection is extended significantly.

The diffused zinc layer has a maximum thickness of about 200μ, and as noted above, the thickness preferably is within the range of 70 to 100 u. If the zinc layer has a thickness greater than about 100 to 200μ, corrosion tends to occur in the vertical direction rather than just on the surface. Moreover, such corrosion develops within a short time period, particularly where an uneven or non-uniform vertical gradient in the zinc density exists.

As noted above, the density of zinc at the surface of the diffused zinc layer is preferably from about 0.4 to 1.2%. When the density is lower than about 0.4%, a satisfactory sacrificial anode effect is not attained, and the ability to form simply a surface corrosion is impaired. When the density is greater than about 2.0%, even though there is a sufficient sacrificial anode effect, corrosion tends to develop quite rapidly because of an excessive wearing of zinc.

EXAMPLE

Figure 2:
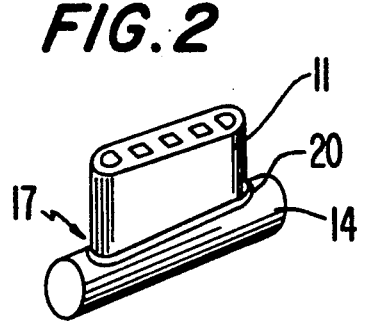
FIG. 2 is an enlarged view, partly in section, of Part A of FIG. 1, showing the brazed connection between the main pipe or heat exchanger core, and a connecting pipe or manifold.

The invention now will be explained with reference to a specific example. A brazing filler metal element 20 (shaped as that shown in FIG. 3) consisting of an aluminum-silicon alloy having a silicon content of between 9.0% to 11.0% (by weight) was chemically plated with zinc. Plating was accomplished by immersing the filler metal element in an aqueous solution containing 30 g/l of zinc oxide and 150 g/l of sodium hydroxide for 4 minutes at a temperature of 30° C. After washing and drying, the filler element was placed at the connection or junction between the inlet opening of a heat exchanger core 11 made of pure aluminum (JIS A1050) having a minimum thickness of about 0.8 mm and a fluid inlet pipe or manifold 13 made of an aluminum-manganese alloy (JIS A3003), as shown in FIG. 2.

The brazing filler metal element was fluxed and dried, and then the assembly was heated for a period of 5 minutes in a furnace heated to 605° C. to effect brazing. While any of the known fluxes suitable for use in brazing aluminum can be used, it is preferred to use a noncorrosive flux consisting essentially of a mixture of potassium fluoroaluminate complexes, e.g., see U.S. Pat. No. 3,951,328 to Wallace et al., issued Apr. 20, 1976.

The effectiveness of the present invention in controlling corrosion at the brazed connections in an aluminum heat exchanger then was confirmed by a corrosion test. A control heat exchanger was prepared in the same manner as outlined above, except that the brazing filler metal element was not plated with zinc prior to brazing. The control sample and the heat exchanger described above, made in accordance with the present invention, were subjected to a 720 hour CASS test according to Japanese Industrial Standards (JIS) D0201 "General Rules of Electroplating for Automobile Parts." After testing, the two heat exchangers were examined to determine the maximum depth of pits formed in their outer surfaces. Results obtained in this test are reported in Table 1.

TABLE 1

| | Results of CASS Test (720 hrs) | |
|---|---|---|
| Heat Exchanger | Maximum Depth of Corrosion | State of Corrosion |
| Control | Penetrated Through Walls | Vertical Pits |
| Prepared By This Invention | 0.39 mm | Surface (horizontal) Corrosion |

As is shown in Table 1, the heat exchanger prepared in accordance with the present invention was clearly superior to the control heat exchanger with respect to its corrosion resistance.

It is recommended that heat exchangers prepared in accordance with the present invention also be subjected to an additional chemical treatment and/or physical coating to form a protective layer on its surface. Such treatment provides a further degree of corrosion resistance and maximizes the useful life of the heat exchanger core.

In the above example, the filler element was plated with zinc in advance to the brazing and the diffused zinc layer was formed by means of heating upon brazing. It should be understood, however, that the diffused zinc layer can be formed by other means, for example, by electroplating of zinc, by the use of a brazing filler element consisting of an aluminum-silicon-zinc alloy, or by applying a coating of zinc powder.

The anit-corrosion treatment of the presetn invention provides the following advantages. A diffused zinc layer of excellent corrosion resistance is formed on the brazed connection and on the surface of the heat exchanger in the vicinity of the brazed connection without requiring additional heating operations, since the diffusion of zinc occurs simultaneously with the brazing of the heat exchanger. Use of the present invention also makes it possible to omit the alkali etching treatment of the brazing filler metal element, which is conventionally used without any adverse effects on its brazing properties.

While the present invention has been described in detail in connection with a preferred embodiment, it is understood that this embodiment is merely exemplary and the invention is not restricted thereto. It will be recognized by those skilled in the art that other variations and modifications can be easily made within the scope of this invention which is defined by the appended claims.

What is claimed is:

1. A method of producing an aluminum heat exchanger having a heat exchanger core with inlet and outlet openings and inlet and outlet pipes connected thereto, wherein both the heat exchanger core and the inlet and outlet pipes are made of an aluminum material, comprising brazing the heat exchanger core to the inlet and outlet pipes with a coated unitary brazing filler metal element comprising a rod of brazing filler metal consisting essentially of an aluminum-silicon alloy containing about 4.5 to 13.0% (by weight) silicon, said rod having a zinc-containing coating thereon, to form a brazed connection, said brazing causing said zinc to diffuse into the surface of the brazed connection and into the heat exchanger core adjacent to the brazed connection to form a diffused zinc layer.

2. The method of claim 1, wherein said diffused zinc layer has maximum thickness of about 200μ.

3. The method of claim 2, wherein said diffused zinc layer has a thickness of from 70 to 100μ.

4. The method of claim 1, wherein said diffused zinc layer has a zinc density at the surface of the heat exchanger of from about 0.4 to 1.2% (by weight).

5. The method of claim 1, wherein said silicon content is between 9.0 to 11.0% (by weight).

6. The method of claim 1, wherein said heat exchanger is a condenser of an automotive air conditioner.

7. The method of claim 1, wherein said heat exchanger is an evaporator of an automotive air conditioner.

* * * * *